United States Patent
Palazzetti

[11] 3,770,292
[45] Nov. 6, 1973

[54] ELECTRONIC CONTROL FOR VEHICLE SUSPENSION SYSTEMS

[75] Inventor: Mario Palazzetti, Avigliana (Turin), Italy

[73] Assignee: FIAT Societa per Azioni, Turin, Italy

[22] Filed: Sept. 22, 1972

[21] Appl. No.: 291,478

[30] Foreign Application Priority Data
Sept. 25, 1971 Italy.............................. 70164 A/71

[52] U.S. Cl.............................. 280/124 F, 280/6 H
[51] Int. Cl............................................. B60g 17/00
[58] Field of Search ........................ 280/6 H, 124 F

[56] References Cited
UNITED STATES PATENTS
2,992,837   7/1961   Rabow............................ 280/124 F
3,550,993   12/1970  Peiffer............................... 280/6 H Primary Examiner—Philip Goodman
Attorney—Richard C. Sughrue et al.

[57] ABSTRACT

Pneumatic fluid is discharged from or supplied to the pneumatic compartment of a hydropneumatic vehicle suspension depending on the sign of the difference between the vehicle speed and the reciprocal square root of the relative displacement between the suspension elements being positive or negative, so that the stiffness of the suspension is increased and reduced with increasing and decreasing speed of the vehicle. Alternatively, in a vehicle having purely hydraulic suspensions, transverse acceleration due to curves is sensed and used to vary the amount of hydraulic fluid in the suspensions associated with individual wheels so as to vary the attitude of the sprung mass of the vehicle in order to compensate for the transverse inertial forces acting on the passengers. Transient vertical forces acting on the wheels due to unevenness of the driving surface are also used to vary the amount of fluid in the suspension so as to simulate the action of springs.

5 Claims, 2 Drawing Figures

ELECTRONIC CONTROL FOR VEHICLE SUSPENSION SYSTEMS

The present invention is related to vehicle suspension systems and is more specifically concerned with apparatus for controlling parameters in independent suspension systems so as to adjust them to changing road and speed conditions.

A general object of the invention is to improve the passengers' comfort in a vehicle moving on a wide variety of surfaces at different speeds.

A more particular object of the invention is to adjust the stiffness of the suspension in a vehicle to varying speed and surface conditions.

A further object of the invention is to control the attitude of a vehicle body with respect to the ground in different driving conditions, so as to achieve maximum comfort for the passengers.

A further object of the invention is to avoid the use of springs or other inherently elastic elements in vehicle suspensions.

SUMMARY OF THE INVENTION

The above and other objects of the invention are achieved by controlling the volume of the pneumatic or hydraulic fluid in hydropneumatic or hydraulic independent wheel vehicle suspensions according to the vehicle speed and/or vehicle transverse acceleration. In one embodiment, the amount of gas in the elastic pneumatic compartment of a hydropneumatic suspension is controlled according to vehicle speed so as to make the resonance frequency of the suspension increase with speed, the displacement of the suspension piston during movement of the vehicle being sensed and processed to obtain a feedback signal for the gas volume control system, an optimal stiffness of the suspension being thus maintained at all times. In another embodiment, the volume of oil in a hydraulic suspension is controlled according to transverse acceleration and vertical displacement of the suspension piston in order to optimize the attitude of the vehicle body with respect to the ground as the vehicle moves along curves, so as to improve the passengers' comfort during movement. In this embodiment, springlike elements in the suspension are dispensed with, their action being simulated through variations of the oil volume under control of the sensed transient vertical force acting on the wheels.

BRIEF DESCRIPTION OF THE DRAWINGS

The above objects, together with other features and advantages of the invention will be more readily apparent from the following detailed description of the drawings, in which.

THE SYSTEM OF FIG. 1

Figure 1:
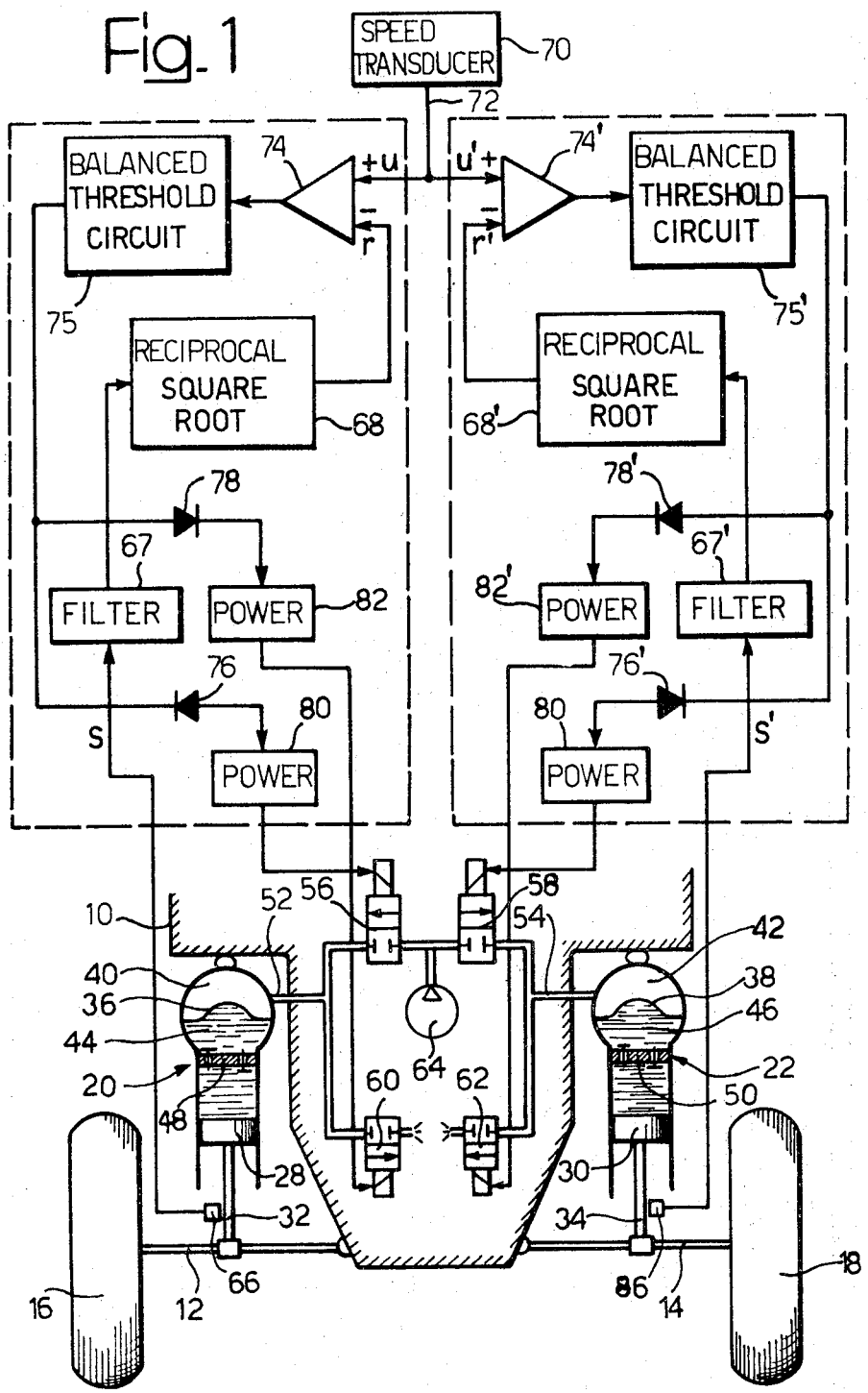
FIG. 1 is a schematic functional block diagram of a first embodiment of a vehicle suspension system according to the invention.

FIG. 1 shows a simplified cross-section of a motor vehicle having a sprung mass 10 with axle shafts 12,14 and road wheels 16,18. The mass 10 is supported on the axle shafts 12,14 through respective hydropneumatic suspensions 20,22. The suspensions 20,22 are known in the art. Each comprises a respective cylinder 24,26; a respective piston 28,20 sliding in the cylinder and having a rod 32,34 connected to the respective axle shaft 12,14; respective flexible diaphragm 36, 38 dividing the cylinder 24,26 into a respective upper compartment 40,42 filled with a gas such as air, and a respective lower compartment 44,46 filled with a hydraulic fluid such as oil. Each of the lower compartments 44,46 further includes, also as known, a respective partition 48,50 having respective pairs of throttled apertures controlled by check valves as known.

According to the invention a respective tube 52,54 leads from each upper compartment 40,42 to a respective branch connection leading on one hand to a respective outlet of a normally closed, twoway, two-position solenoid operated valve 56, 58, and on the other hand, to a respective inlet of a normally closed, two-way, twoposition solenoid operated valve 60,62. The inlet of valves 56, 58 are both connected to a compressor 64 or other suitable source of pneumatic pressure. The outlets of valves 60,62 exhaust to the atmosphere.

The average position of piston 28 is sensed by a position transducer 66, of any suitable known type, such as of the differential transformer type, which will provide an output signal $s$ proportional to the displacement of the piston with respect to the cylinder. The signal $s$ is filtered in a low-pass filter 67 and processed in a circuit 68 providing the reciprocal square root of this signal as an output. The output signal of 68 is therefore a signal $r = B/\sqrt{s}$, where B is a predetermined constant value.

A speed transducer 70 provides an output singal $u$ on a line 72. The speed signal $u$ and the processed position signal $r$ are then applied to the direct and the inverting inputs of a differential amplifier 74, respectively. The difference signal at the output of amplifier 74 is then applied to a balanced threshold circuit 75, whose output takes a constant positive value if the speed signal exceeds the position signal by more than a predetermined small threshold, while it takes a constant negative value if the processed position signal exceeds the speed signal by more than said threshold. If the difference of the $u$ and $r$ signals lies within the balanced threshold, or, in other words, if it is sufficiently near zero, the output signal of the balanced threshold comparator 74 is zero. This output signal is then applied through respective oppositely poled diodes to power amplifiers 80,82, which drive the solenoids of the valves 56, 60, respectively. Gas is therefore discharged from the upper compartment 40 when the speed signal $u$ is greater than the processed position signal $r$, thus decreasing the volume of the upper compartment, while gas is supplied when the speed signal $u$ is less than the processed position signal $r$, thus increasing the gas volume. The volume of gas is left unchanged if $u = r$.

A similar circuitry is provided for driving the valves 58, 62 of the suspension 46. a circuit 84, including components similar to the above-described components 68, 74, 75, 76, 78, 80 and 82, is driven by the speed signal $u$ provided by the speed transducer 70, and moreover by a position signal $r'$ of the piston 30, provided by a second position transducer 86, cooperating with the suspension 46.

The remaining suspensions of the vehicle (not shown in the drawing) also may, and usually will, be provided with similar systems for varying the volume of gas in the upper compartments of the respective cylinders.

OPERATION OF THE SYSTEM OF FIG. 1

The operation of the suspension system of FIG. 1 will be best understood by considering the dependence of the elastic stiffness of the upper compartment on the volume V of the gas contained in it. Since the fluid in the lower compartment of the suspension is incompressible and the cross-sectional area A of the diaphragms 36 or 38 is constant, the position signal $s$ is proportional to the volume V of the upper compartment. Calling F the force exerted by the sprung mass $m$ of the vehicle on the suspension, the stiffness of the suspension is therefore:

$$k = \frac{\Delta F}{\Delta S} = \frac{Ap}{\frac{v}{A}} \simeq A^2 \frac{dp}{dv}$$

where $p = F/A$ is the pressure in the upper compartment, and has a constant value.

If Boyle's law is taken to hold, as a working approximation, for the gas in the upper compartment, then $$(dp/dV) = (po\, Vo/V^2) \qquad 1$$

where $po$ and $Vo$ are the pressure and volume under rest conditions, or the average pressure and volume as the vehicle moves along a surface. Since the operation point of the suspension will vary slightly with the oscillations of the suspensions, a further approximation may be held to be allowable for the present purpose, putting $V \cong Vo$ in the equation (1), so tthat $$(dp/dV) = (po/Vo)$$

The stiffness $k$ of the upper compartment may therefore be written as:

$$k = A^2 (po/Vo) .$$

The resonance angular frequency $wo$ of the suspension is therefore:

$$W_o = \sqrt{(k/m)} = A \sqrt{(po/mV_o)} = (B/\sqrt{s}) = r,$$

$B$ being a constant for a given vehicle.

It is thus seen that the suspension system of the invention, by varying the volume of the gas in the upper compartment so that $u = r$, has the resonance frequency depend linearly on the speed of the vehicle. By a suitable choice of the constant $B$, the resonance frequency is then kept at all times as low as it is safe to do at the given speed, so affording the passengers the best comfort that can be reached without endangering the safety of the vehicle by reducing the grip of the wheels on the road.

THE SYSTEM OF FIG. 2

Figure 2:
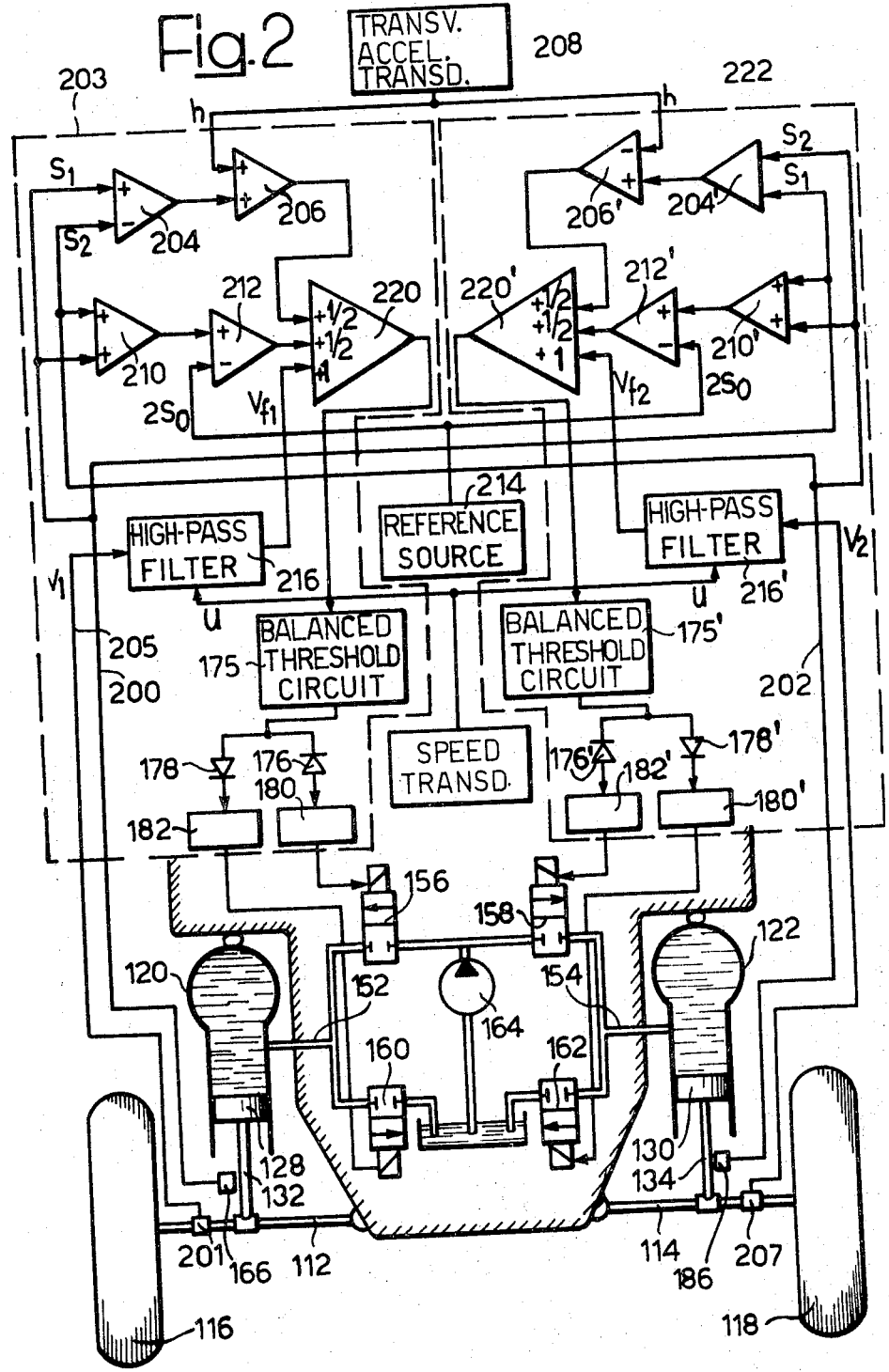
FIG. 2 is a schematic functional block diagram of a second embodiment of a vehicle suspension system according to the invention.

FIG. 2 shows a different embodiment of the invention. The mechanical and fluid power portion of the suspension system is similar to the corresponding portion of FIG. 1, except that the suspensions are purely hydraulic rather than hydropneumatic, and the fluid circuit is therefore a hydraulic one and varies the volume of oil in the cylinders.

The arrangement thus includes a sprung mass 10, axle road wheels 16,18 hydraulic suspensions 120, 122 with cylinders 124, 126, pistons 128,130 having rods 132, 134, apertured partitions 148, 150. Solenoid operated, two-way, two-position normally closed valves 156,158 have their inlets connected to a hydraulic pump 164 drawing from a reservoir 165 and their outlets connected to respective tubes 152, 154 leading to the cylinders 124,126. Similar valves 160,162 have their inlets also connected to the tubes 152,154 and their outlets discharging to reservoir 165. Respective position transducers 166,186, similar to position transducers 68,86 of FIG. 1, cooperate with pistons 128, 130 to generate piston position signals $s_1$, $s_2$ on output lines 200,202 which lead to a control unit 203, as described later.

Lines 200, 202 are respectively connected to the direct and the inverting inputs of a differential amplifier 204, whose output signal, the difference $s_1 - s_2$, is summed in a summing amplifier 206 with the output signal $h$ of a transverse acceleration transducer 208, mounted on the vehicle body for sensing any transverse acceleration acting on it. The output signal $h$ of the transducer 208 is proportional to the transverse acceleration $a$ acting on the vehicle according to the equation:

$$h = (d/g)a,$$

where $d$ is the width of the vehicle between the supporting points of suspensions 120, 122, while g is the gravity acceleration. Lines 200, 202 are also connected to the inputs of a summing amplifier 210. The output sum signal of this amplifier is applied to a direct input of a differential amplifier 212, having a constant rest position signal $2s_o$ applied to its inverting input from a source 214.

A stress transducer 201, such as a strain gauge device, is mounted on axle shaft 112 for sensing any flexional stresses reflecting a vertical force applied to the wheel 116 from the ground and generates a vertical force signal $v$ on a line 205. This line is connected to the input of a high-pass filter 216 with adjustable lower cut-off frequency, providing a signal $v_{fl}$ representing the higher frequency components, or transient components, of the vertical force acting on the wheel. A vehicle speed transducer 170 provides an output signal $u$ which is applied to a cut-off frequency control input of filter 216 for adjusting the cut-off frequency to a value which increases with increasing speed of the vehicle.

The output signal $s_1-s_2+h$ of amplifier 206, the output signal $s_1+s_2- 2s_o$ of amplifier 212 and the output signal $v_{fl}$ of filter 216 are then summed in an operational amplifier 220, whereby the two first mentioned signals are given a weight ½. The output signal of amplifier 220 is therefore:

$$e_1 = (s_1 - s_2 + H/2) + (s_1 + s_2 - 2s_o/2) + v_{fl} = s_1 - s_o + (h/2) + v_{fl}.$$

Signal $e_1$ is applied to a balanced threshold circuit 175, similar to circuit 75 of FIG. 1. The output signal of threshold circuit 175 will take on a positive constant value if signal $e_1$ differs from zero in a positive direction by more than a predetermined small threshold, while it will take on a negative constant value if signal $e_1$ difers from zero in a negative direction by more than said threshold. The output signal of circuit 175 will be zero whenever signal $e_1$ lies within the balanced threshold.

Similarly to the arrangement of FIG. 1, the system of FIg. 2 then comprises two power amplifiers 180,182 which are driven by threshold circuit 175 through respective oppositely poled diodes 176, 178. Power amplifiers 180, 182 drive valves 156,160, respectively.

Amplifiers 204,206,210,212,220 filter 216 and threshold circuit 175, together with diodes 176, 178 and power amplifiers 180,182 make up the control unit 203.

For energizing valves 158,162, the system of FIG. 2 also comprises a further control unit 222. This is identical to unit 203, and its components are similarly labeled, with the addition of a prime, except that lines 200,202 are here interchanged, while the summing amplifier 206 is here replaced by a differential amplifier 206', so that the output signal $e_2$ generated by the unit 222 is:

$$e_2 = s_2 - s_o - (h/2) + v_{f2}.$$

The input signals $h$, $s_o$ and $u$ for unit 222 are provided by the same sources 208,214 and 170 as for unit 203, while a stress signal $v_2$ relating to wheel 118 is provided by a second stress transducer 207.

OPERATION OF THE SYSTEM OF FIG. 2

In order to more easily understand the operation of the system of FIG. 2, the assumption will first be made that signals and $h$ $v_f$ are zero. This situation would arise when the vehicle is moving along a rectilinear path on a perfectly smooth surface, for in such case the transverse acceleration would be nil, while the filter 216 would block any input signal components, however low its cut-off frequency is.

Signals $e_1$ and $e_2$ are then:

$$e_1 = s_1 - s_o$$
$$e_2 = s_2 - s_o$$

In such circumstances, if either or both of the signals $e_1$ and $e_2$ are different from zero, this means that the vehicle body is not parallel to the road surface, and the system acts to bring it into parallelism. More specifically, if $e_1 > 0$, the left-hand side of the vehicle body is higher than the prescribed rest position, and the power amplifier 182 is energized through diode 178 for discharging oil from the cylinder 120 through valve 160 until the rest position of piston 128 is reached. If $e_1 < 0$, oil is supplied to the cylinder 120. A similar operation is performed for the right-hand suspension, by circuitry 222. The vehicle body is therefore always brought to a horizontal attitude, with the suspensions at a height $s_o$ which will be conveniently chosen at a mid position of the range of displacement of each piston.

When the vehicle moves along a curve, a transverse acceleration is developed on the vehicle body, which causes discomfort to the passengers and affects the driving performance of the vehicle When the vehicle moves along a curve, an acceleration signal $h$ is developed by transverse acceleration transducer 208, so that the signals $e_1$ and $e_2$ become:

$$e_1 = s_1 - s_o + (h/2)$$
$$e_2 = s_2 - s_o (h/2)$$

The system then operates to vary the displacements of pistons 128,130 of suspensions 120,122, in such a way that the left-hand side of the vehicle will be brought to a level lower than $s_o$ by an amount $h/2$, while the right-hand side will reach a level higher than $s_o$ by the same amount. The difference of the respective levels of the sides will then be $h$, and the angle $\alpha$ of transverse inclination will be given by the equation:

$$\tan\alpha = (h/d) = (1/d) a = (a/g)$$

where $d$, $g$ and $a$ have the meanings defined above. The inclination of the vehicle body is thus seen to be equal to angle of the total force acting on the body with respect to the vertical, so that the passengers will not be subjected to a force tending to shift them out of their seats, but rather to a mere increase of their apparent weight.

Finally, if the surface on which the vehicle is moving is not smooth, the position signals $s_1$ and $s_2$ will show high frequency components, short-time variations, whose frequencies will be the higher, the faster the vehicle moves. These are the frequencies which would be damped by elastic elements such as springs cooperating with shock absorbers in conventional suspension systems. In the system of FIG. 2, the high frequency components of the signals $s_1$ and $s_2$ are passed by the filters 216, 216', and contribute to signals $e_1$ and $e_2$, with a sign which can be readily seen to provide compensation of the displacement with a final effect similar to the action of a spring. The system of FIG. 2 thus avoids the use of mechanical or pneumatic springlike elements, by simulating their action by electronic means.

The stiffness of the simulated spring is moreover advantageously varied similarly to the operation of the system of FIG. 1, by increasing the cut-off frequency of filter 216, 216', and consequently the stiffness of the equivalent spring, with increasing speed of the vehicle.

While FIG. 2 only shows two wheels with attendant suspensions, a vehicle always has at least two further wheels with attendant suspensions. The suspensions of the further wheels are then provided with supply valves similar to valves 156, 158 and with discharge valves similar to valves 160,162. The supply valves may be connected to the same pump 164 shown in FIG. 2.

The valves of the two further wheels are then driven by units 203, 222, respectively, It is thus insured that the attitude of the vehicle is changed uniformly over its length, while the unevenness of the road is usually met in sequence by all wheels on a side of the vehicle, under normal driving conditions. If the wheels of FIG. 2 are taken to be front wheels of a vehicle, the suspensions of the rear wheels would be operated by the same control signal $e$ which operates the front suspensions, suitably delayed to take into account the time taken by the rear wheels to reach a position previously occupied by the front wheels. As this connection appears to be obvious to a person skilled in the field, and as it does not constitute part of the invention proper, it has not been particularly shown in the drawings, for a better clarity and simplicity of illustration.

Alternatively, the rear suspensions might be provided with independent units similar to units 203, 222.

With reference to balanced threshold circuits 75 and 175 of FIGS. 1 and 2, respectively, mention has been made of a "small" threshold. This adjective is to be understood to mean that the threshold will be made as small as practical, compatibly with a proper operation of the system. In principle, the threshold might be taken to be zero, so that any disturbance however small, would be taken care of by the respective system. However, this would bring about an incessant operation of the supply and discharge valves. A small threshold is then provided to insure that the valves are left inoperative for a substantial fraction of the time. The exact definition of the threshold value will be determined, however, by the specific operating conditions, such as the type of vehicle, the type of suspensions, etc.

While certain preferred embodiments of the invention have been specifically disclosed, it is understood that the invention is not limited thereto, as many variations will be readily apparent to those skilled in the art, and the invention is to be given the broadest possible interpretation within the terms of the following claims.

What we claim is:

1. A hydropneumatic independent wheel vehicle suspension system, wherein a cylinder and piston suspension device having a hydraulic fluid compartment and a pneumatic fluid compartment supports a sprung mass of the vehicle on an axle shaft of a vehicle wheel, comprising:
   a. a vehicle speed transducer mounted on the vehicle for providing a speed signal representing the vehicle speed;
   b. a position transducer providing a position signal representing the extension of the suspension device;
   c. processing means connected to the position transducer for generating a reference signal proportional to the reciprocal square root of the position signal according to a predetermined proportionality factor;
   d. a difference circuit having a direct input connected to the speed transducer and an inverting input connected to the processing means for generating a difference signal proportional to the difference of the speed signal and the reference signal;
   e. means driven by the difference signal to discharge fluid from the pneumatic fluid compartment if the difference signal is greater than zero by more than a predetermined threshold, and to supply fluid to the pneumatic compartment if the difference signal is less than zero by more than the threshold.

2. The hydropneumatic suspension system of claim 1, wherein the means driven by the difference signal comprise:
   a. a source of pneumatic pressure;
   b. a first solenoid operated, two-way, two-position normally closed valve connecting the compressor to the pneumatic fluid comparatment of the suspension device;
   c. a second solenoid operated, two-way, two-position normally closed valve connecting the pneumatic fluid compartment to the atmosphere;
   d. power means driven by the difference circuit, for energizing the second solenoid valve to open when the difference signal is greater than zero by more than the threshold and to energize the first solenoid valve to open when the difference signal is less than zero by more than the threshold.

3. A hydraulic independent wheel vehicle suspension system, wherein a first and a second fluid-filled hydraulic cylinder and piston suspension devices support a sprung mass of the vehicle on the respective axle shafts of a first and second corresponding vehicle wheels, the respective suspension devices being provided with first and second fluid handling means energizable to supply fluid to or discharge fluid from their respective cylinders, further comprising:
   a. a first and a second position transducers, respectively associated with the first and second suspension devices for providing respective position signals representing the respective extensions of the suspension devices;
   b. a transverse acceleration transducer on the vehicle, for generating a transverse acceleration signal representing the transverse acceleration acting on the vehicle;
   c. a rest position reference source for providing a predetermined constant rest position signal representing a desired extension of the suspension device at rest;
   d. first linear-combination means having inputs connected to the first position transducer, to the acceleration transducer and to the rest position reference source, respectively, for generating a first energizing signal proportional to the first position signal minus the rest position signal plus half the acceleration signal, the first energizing signal being applied to energize the first fluid handling means to discharge fluid from the first cylinder when the first energizing signal is greater than zero by more than a predetermined threshold and to supply fluid to the first cylinder when the first energizing signal is less than zero by more than the threshold:
   e. a second linear-combination means having inputs connected to the second position transducer, to the acceleration transducer and to the rest position reference source, respectively, for generating a second energizing signal proportional to the second position signal minus the rest position signal minus half the acceleration signal, the second energizing signal being applied to energize the second fluid handling means to discharge fluid from the second cylinder when the second energizing signal is greater than zero by more than the threshold and to supply fluid to the second cylinder when the second energizing signal is less than zero by more than the threshold.

4. The hydraulic suspension system of claim 3, further comprising:
   f. a first and a second stress transducers associated with the axle shafts of the first and second wheel, respectively, for providing a first and a second stress signals representing vertical forces acting on the first and second wheels, respectively;
   g. a first and a second high-pass filters, having a predetermined lower cut-off frequency, connected to the first and second stress transducer, respectively, for providing a first and a second filtered stress signals, respectively;
   h. the first and second linear-combination means having respective further inputs connected to the inputs of the filters and summing the first filtered stress signal to the first energizing signal for providing a third energizing signal, and summing the second filtered stress signal to the second energizing signal for providing a fourth energizing signal, the third and fourth energizing signals being applied for energizing the first and second fluid handling means, respectively, to discharge fluid from the associated cylinder when the third or respectively fourth energizing signal is greater than zero by more than the threshold, and to supply fluid to the associated cylinder when the third or respectively fourth energizing signal is less than zero by more than the threshold.

5. The hydraulic suspension system of claim 4, wherein the first and second high-pass filters have respective cut-off frequency control inputs, and the system further comprises:
  i. A vehicle speed transducer mounted on the vehicle for providing a speed signal representing the vehicle speed, the vehicle speed transducer being connected to the cut-off frequency control inputs of the filters for controlling their cut-off frequency to a value increasing with increasing speed of the vehicle.

* * * * *